US012398232B2

(12) United States Patent
Rolfsen et al.

(10) Patent No.: US 12,398,232 B2
(45) Date of Patent: Aug. 26, 2025

(54) HFO CONTAINING PU FORMULATION

(71) Applicant: BASF SE, Ludwigshafen am Rhein (DE)

(72) Inventors: Christine Rolfsen, Lemfoerde (DE); Marko Grever, Lemfoerde (DE); Josep-Daniel Eslava, Rubi (ES); Mark Elbing, Gross Groenau (DE)

(73) Assignee: BASF SE, Ludwigshafen am Rhein (DE)

( * ) Notice: Subject to any disclaimer, the term of this patent is extended or adjusted under 35 U.S.C. 154(b) by 197 days.

(21) Appl. No.: 16/480,578

(22) PCT Filed: Jan. 30, 2018

(86) PCT No.: PCT/EP2018/052217
§ 371 (c)(1),
(2) Date: Jul. 24, 2019

(87) PCT Pub. No.: WO2018/141716
PCT Pub. Date: Aug. 9, 2018

(65) Prior Publication Data

US 2019/0389996 A1 Dec. 26, 2019

(30) Foreign Application Priority Data

Jan. 31, 2017 (EP) .................................... 17153938

(51) Int. Cl.

| | |
|---|---|
| ***C08G 18/16*** | (2006.01) |
| ***C08G 18/18*** | (2006.01) |
| ***C08G 18/20*** | (2006.01) |
| ***C08G 18/22*** | (2006.01) |
| ***C08G 18/24*** | (2006.01) |
| ***C08G 18/32*** | (2006.01) |
| ***C08G 18/40*** | (2006.01) |
| ***C08G 18/42*** | (2006.01) |
| ***C08G 18/48*** | (2006.01) |
| ***C08G 18/50*** | (2006.01) |
| ***C08G 18/76*** | (2006.01) |
| ***C08J 9/14*** | (2006.01) |
| ***C08L 71/02*** | (2006.01) |

(52) U.S. Cl.
CPC ....... *C08G 18/4018* (2013.01); *C08G 18/163* (2013.01); *C08G 18/165* (2013.01); *C08G 18/1808* (2013.01); *C08G 18/1816* (2013.01); *C08G 18/1833* (2013.01); *C08G 18/1858* (2013.01); *C08G 18/2027* (2013.01); *C08G 18/225* (2013.01); *C08G 18/246* (2013.01); *C08G 18/425* (2013.01); *C08G 18/482* (2013.01); *C08G 18/4845* (2013.01); *C08G 18/485* (2013.01); *C08G 18/4883* (2013.01); *C08G 18/5069* (2013.01); *C08J 9/146* (2013.01); *C08J 2201/022* (2013.01); *C08J 2203/162* (2013.01); *C08J 2375/08* (2013.01)

(58) Field of Classification Search
CPC ............ C08G 18/4018; C08G 18/4816; C08G 18/482; C08G 18/4829; C08G 18/4833; C08G 18/4837; C08G 18/4845; C08G 18/485; C08G 18/5021; C08J 9/143; C08J 9/144
See application file for complete search history.

(56) References Cited

U.S. PATENT DOCUMENTS

| | | | |
|---|---|---|---|
| 3,001,973 A | 9/1961 | Piepenbrink et al. | |
| 3,124,605 A | 3/1964 | Wagner et al. | |
| 3,201,372 A | 8/1965 | Wagner et al. | |
| 3,277,138 A | 10/1966 | Holtschmidt et al. | |
| 3,394,164 A | 7/1968 | Mcclellan et al. | |
| 3,401,190 A | 9/1968 | Schmitt et al. | |
| 3,454,606 A | 7/1969 | Brotherton et al. | |
| 3,492,330 A | 1/1970 | Trecker et al. | |
| 4,868,224 A | 9/1989 | Harasin et al. | |
| 6,403,847 B1 | 6/2002 | Nakada et al. | |
| 6,844,475 B1 | 1/2005 | Tung et al. | |
| 7,189,884 B2 | 3/2007 | Mukhopadhyay et al. | |
| 7,230,146 B2 | 6/2007 | Merkel et al. | |
| 9,051,442 B2 * | 6/2015 | Williams ........... | C08G 18/1816 |
| 2004/0256594 A1 | 12/2004 | Singh et al. | |
| 2007/0290177 A1 | 12/2007 | Singh et al. | |
| 2009/0278076 A1 | 11/2009 | Singh et al. | |
| 2010/0280141 A1 * | 11/2010 | Loh ......................... | C08J 9/146 521/155 |

(Continued)

FOREIGN PATENT DOCUMENTS

| | | | |
|---|---|---|---|
| WO | WO 2009/048807 A2 | 4/2009 | |
| WO | WO 2014/037476 A1 | 3/2014 | |
| WO | WO-2015131340 A1 * | 9/2015 | ......... C08G 18/4018 |

OTHER PUBLICATIONS

"Pentane", 2023, National Institute of Standards and Technology (NIST) Chemistry WebBook, SRD 69 (Year: 2023).*
"Cyclopentane", 2023, National Institute of Standards and Technology (NIST) Chemistry WebBook, SRD 69 (Year: 2023).*
International Search Report issued on May 4, 2018 in PCT/EP2018/052217 filed Jan. 30, 2018, 6 pages.
Written Opinion of the International Searching Authority issued on Jan. 2, 2019 in PCT/EP2018/052217 filed Jan. 30, 2018, 6 pages.

(Continued)

*Primary Examiner* — Melissa A Rioja
(74) *Attorney, Agent, or Firm* — Grüneberg and Myers PLLC

(57) ABSTRACT

The present invention is directed to polyol composition comprising a polyol mixture (PM) comprising a polyetherol (P1) based on a polyhydric alcohol and a polyetherol (P2) based on a diamine; and at least one hydrohaloolefin (HFO) as blowing agent, a process for preparing a polyurethane foam using said polyol composition and the polyurethane foam obtained or obtainable by said process.

13 Claims, No Drawings

(56) References Cited

U.S. PATENT DOCUMENTS

| | | | | |
|---|---|---|---|---|
| 2011/0124756 | A1 | 5/2011 | Singh et al. | |
| 2011/0124757 | A1 | 5/2011 | Singh et al. | |
| 2011/0124758 | A1* | 5/2011 | Loh | C08G 18/092 521/131 |
| 2011/0218261 | A1* | 9/2011 | Loh | C08G 18/5027 521/117 |
| 2012/0004336 | A1* | 1/2012 | Loh | C08J 9/146 521/131 |
| 2013/0217784 | A1 | 8/2013 | Singh et al. | |
| 2013/0345329 | A1 | 12/2013 | Singh et al. | |
| 2014/0202182 | A1 | 7/2014 | Singh et al. | |
| 2014/0216075 | A1 | 8/2014 | Singh et al. | |
| 2015/0094388 | A1 | 4/2015 | Singh et al. | |
| 2015/0094389 | A1 | 4/2015 | Singh et al. | |
| 2015/0232631 | A1 | 8/2015 | Balbo Block et al. | |
| 2016/0017231 | A1 | 1/2016 | Singh et al. | |
| 2016/0090459 | A1 | 3/2016 | Singh et al. | |
| 2016/0090460 | A1 | 3/2016 | Singh et al. | |
| 2016/0369077 | A1* | 12/2016 | Hu | C08J 9/0023 |
| 2017/0233623 | A1 | 8/2017 | Singh et al. | |
| 2018/0134861 | A1* | 5/2018 | Schilling | C08G 18/482 |
| 2020/0299453 | A1* | 9/2020 | Saad | C08G 18/7671 |
| 2021/0332204 | A1* | 10/2021 | Denicola, Jr. | G09F 3/0291 |

OTHER PUBLICATIONS

International Preliminary Report on Patentability issued on Apr. 3, 2019 in PCT/EP2018/052217 filed Jan. 30, 2018, 14 pages.

"Ullmann's Encyclopedia of Industrial Chemistry" VCH, Weinheim, vol. A21, 5th edition 1992, pp. 665-715.

* cited by examiner

HFO CONTAINING PU FORMULATION

The present invention is directed to a polyol composition comprising a polyol mixture (PM) comprising a polyetherol (P1) based on a polyhydric alcohol and a polyetherol (P2) based on a diamine; and at least one hydrohaloolefin (HFO) as blowing agent. Furthermore, the present invention is directed to a process for preparing a polyurethane foam using said polyol composition and the polyurethane foam obtained or obtainable by said process.

It is known in the art to produce rigid polyurethane and polyisocyanurate foams by reacting a polyisocyanate with a polyol in the presence of a blowing agent, a catalyst, a surfactant and optionally other ingredients.

The class of foams known as low density, rigid polyurethane or polyisocyanurate foams has utility in a wide variety of insulation applications including roofing systems, building panels, building envelope insulation, refrigerators and freezers. A critical factor in the large-scale commercial acceptance of rigid polyurethane foams has been their ability to provide a good balance of properties. Rigid polyurethane and polyisocyanurate foams are known to provide outstanding thermal insulation, excellent fire resistance properties, and superior structural properties at reasonably low densities. The foam industry has historically used liquid fluorocarbon blowing agents because of their ease of use in processing conditions. Fluorocarbons not only act as blowing agents by virtue of their volatility, but also are encapsulated or entrained in the closed cell structure of the rigid foam and are the major contributor to the low thermal conductivity properties of the rigid urethane foams.

Due to environmental legislation restricting the use of chlorofluorocarbons and hydrochlorofluorocarbons as blowing agents, hydrocarbons are often used as viable alternative blowing agents in the manufacture of rigid polyurethane or polyisocyanurate foams. Hydrocarbons are readily available and provide a cost-effective alternative to chlorofluorocarbons and hydrochlorofluorocarbons.

Due to the non-polar hydrophobic characteristics of hydrocarbons, they are only partially soluble in many polyols used to manufacture rigid polyurethane or polyisocyanurate foams. As a result of the poor solubility of hydrocarbon blowing agents, the blowing agent must usually be added to the polyol just prior to dispensing it through a mixing head. The limited shelf life of hydrocarbon-polyol mixtures has limited the ability of storing batches for later use.

Another problem with these mixtures is their potential limited process phase stability or limited resistance to separation into layers of different composition. If there is a phase separation during the process, the hydrocarbon blowing agent has the tendency to rise to the top of the mixture and vaporize; thereby posing a potential safety hazard should the concentration of the hydrocarbon reach the explosion limit.

A phase separation during the process often causes non-uniform and uneven cell structures in the resultant polyurethane or polyisocyanurate foam. Such non-uniform cell structure can lead to variations in the properties of a foam product, such as the thermal conductivity or insulation value.

Preferred blowing agents have low global warming potential. Among these are hydrohaloolefins. Processes for the manufacture are disclosed in U.S. Pat. Nos. 7,230,146 and 7,189,884 as well as in U.S. Pat. Nos. 6,844,475 and 6,403,847.

It is convenient in many applications to provide the components for polyurethane or polyisocyanurate foams in pre-blended formulations. Most typically, the foam formulation is pre-blended into two components. The polyisocyanate and optional isocyanate compatible raw materials comprise the first component, commonly referred to as the "A" component. A polyol or mixture of polyols, surfactant, catalyst, blowing agent, and other isocyanate reactive and non-reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and other polyols can be added to the mixing head or at the site of application. Most conveniently, however, they are all incorporated into one B component.

A shortcoming of two-component systems, especially those using certain hydrohaloolefins, including HFO-1234ze and HCFO-1233zd is the shelf-life of the B-side composition. Normally when a foam is produced by bringing together the A and B side components, a good foam is obtained. However, if the polyol premix composition is aged, prior to treatment with the polyisocyanate, the foams are of lower quality and may even collapse during the formation of the foam.

It has been found that the origin of the problem is the reaction of certain amine catalysts with certain hydrohaloolefins including HFO-1234ze and HCFO-1233zd, resulting in partial decomposition of the blowing agent. In WO 2009/048807 A2 it is disclosed that, subsequent to the decomposition of the blowing agent, the molecular weight of the polymeric silicone surfactants, if present, is detrimentally altered, leading to poor foam structure.

Even though numerous processes for preparing polyurethanes exist in the state of the art, there is still a need for polyol compositions for preparing rigid polyurethane foams which have good storage stability.

It was an object of the present invention to provide polyol compositions for the preparation of polyurethane foams comprising hydrohaloolefins with good storage stability.

According to the present invention, this object is solved by a polyol composition comprising (a) a polyol mixture (PM) comprising a polyetherol (P1) based on a polyhydric alcohol and a polyetherol (P2) based on a diamine; and (b) at least one hydrohaloolefin (HFO) as blowing agent.

It was surprisingly found that in the presence of a polyetherol based on a diamine the decomposition of the HFO due to the presence of reactive amine catalysts is significantly reduced as compared to polyol compositions without diamine-based polyetherols.

The polyol composition according to the present invention comprises a polyol mixture (PM) as well as at least one hydrohaloolefin (HFO) as blowing agent.

The blowing agent component comprises a hydrohaloolefin, but optionally can comprise further blowing agents such as hydrocarbons, pentane, water, dimethoxymethane, formic acid, methyl formate, or combinations thereof.

The hydrohaloolefin preferably comprises at least one haloalkene such as a fluoroalkene or chloroalkene containing from 2 to 5, preferably from 3 to 4 carbon atoms and at least one carbon-carbon double bond. Suitable hydrohaloolefins include trifluoropropenes, tetrafluoropropenes such as (HFO-1234), pentafluoropropenes such as (HFO-1225), chlorotrifluoropropenes such as (HFO-1233), chlorodifluoropropenes, chlorotrifluoropropenes, chlorotetrafluoropropenes, and combinations of these. More preferred that the compounds of the present invention are the tetrafluoropropene, pentafluoropropene, and chlorotrifluoropropene compounds in which the unsaturated terminal carbon has not more than one F or Cl substituent. Included are 1,3,3,3-tetrafluoropropene (HFO-1234ze); 1,1,3,3-tetrafluoropropene; 1,2,3,3,3-pentafluoropropene (HFO-1225ye); 1,1,1-trifluoropropene; 1,1,1,3,3-pentafluoropropene (HFO-1225zc); 1,1,1,3,3,3-hexafluorobut-2-ene, 1,1,2,3,3-pentafluoropropene (HFO-1225yc); 1,1,1,2,3-pentafluoropropene (HFO-1225yez); 1-chloro-3,3,3-trifluoropropene (HCFO-1233zd); 1,1,1,4,4,4-hexafluorobut-2-ene or combinations thereof, and any and all structural isomers, geometric isomers, or stereoisomers of each of these. Preferably, the hydrohaloolefin is selected from the group consisting of trans-1-chloro-3,3,3-trifluoropropene (HCFO-1233zd(E)), cis-1-chloro-3,3,3-trifluoropropene (HCFO-1233zd(Z)), trans-1,1,1,4,4,4-hexafluorobut-2-ene (HFO-1336mzz(E)), cis-1,1,1,4,4,4-hexafluorobut-2-ene (HFO-1336mzz(Z)), trans-1,3,3,3-tetrafluorprop-1-en (HFO-1234ze(E)), cis-1,3,3,3-tetrafluorprop-1-en (HFO-1234ze(Z)) or mixtures thereof.

According to a further embodiment, the present invention is therefore directed to a polyol composition as disclosed above, wherein the hydrohaloolefin is selected from the group consisting of trans-1-chloro-3,3,3-trifluoro-propene (HCFO-1233zd(E)), cis-1-chloro-3,3,3-trifluoro-propene (HCFO-1233zd(Z)), trans-1,1,1,4,4,4-hexafluoro-but-2-ene (HFO1336mzz(E)), cis-1,1,1,4,4,4-hexafluoro-but-2-ene (HFO1336mzz(Z)), trans-1,3,3,3-tetrafluorprop-1-en (HFO1234ze(E)), cis-1,3,3,3-tetrafluorprop-1-en (HFO1234ze(Z)).

According to the present invention, the polyol mixture (PM) comprising a polyetherol (P1) based on a polyhydric alcohol and a polyetherol (P2) is based on a diamine.

In the context of the present invention, “based on” is to be understood as a compound which is obtained or obtainable by the reaction on a given reactant. “Based on a polyhydric alcohol” thus means that the polyetherol is obtained or obtainable by the reaction of a polyhydric alcohol, for example the reaction of a polyhydric alcohol with an alkylene oxide.

According to the present invention, polyetherol (P1) based on a polyhydric alcohol can be any suitable polyetherol. Preferably, the polyhydric alcohol is selected from the group consisting of sucrose, pentaerythritol, glucose, trimethylolpropane (TMP), glycerol, sorbitol, glycol, or combinations thereof. Suitable combinations of starters also include mixtures of two or more polyhydric alcohols such as mixtures of sucrose and glycerol, sucrose and diethylene glycol (DEG), or sucrose, pentaerythritol and diethylene glycol (DEG). Thus, polyetherol (P1) preferably is based on a polyhydric alcohol which is selected from the group consisting of sucrose, pentaerythritol, glucose and sorbitol. Suitable polyetherols are known to the person skilled in the art and can be prepared by any suitable method.

According to a further embodiment, the present invention is therefore directed to a polyol composition as disclosed above, wherein the polyhydric alcohol is selected from the group consisting of sucrose, pentaerythritol, glucose, glycerol, glycol, trimethylolpropane (TMP) and sorbitol.

Methods of forming polyoxyalkylene polyether polyols are well known, for example, by the base catalyzed addition of alkylene oxides to an initiator molecule containing reactive hydrogens such as a polyhydric alcohol.

Examples of useful alkylene oxides include ethylene oxide, propylene oxide, butylene oxide, and mixtures thereof. In the context of the present invention, the polyetherol (P1) based on a polyhydric alcohol preferably comprises polyoxyethylene or polyoxypropylene blocks or mixed blocks comprising polyoxyethylene and polyoxypropylene structures.

Polyetherol (P2) is based on a diamine. Suitable diamines are known to the person skilled in the art. Preferably, the diamine is selected from toluene diamine (TDA), ethylene diamine, diaminodiphenylmethane (MDA), polyphenylene polymethylene polyamines (PMDA), and mixtures thereof. In the context of the present invention, the polyetherol (P2) based on a diamine preferably comprises polyoxyethylene or polyoxypropylene blocks or mixed blocks comprising polyoxyethylene and polyoxypropylene structures. More preferably, the polyether blocks of polyetherol (P2) comprise bocks of propylene oxide or mixed blocks of ethylene oxide and propylene oxide. In principle, it is possible to use all TDA isomers. When TDA is used, it is possible to use all isomers either alone or in any mixtures with one another. In particular, it is possible to use 2,4-TDA, 2,6-TDA, mixtures of 2,4-TDA and 2,6-TDA, 2,3-TDA, 3,4-TDA, mixtures of 3,4-TDA and 2,3-TDA and also mixtures of all isomers mentioned. 2,3-TDA and 3,4-TDA are frequently also referred to as ortho-TDA or vicinal TDA. Preference is given to using TDA having a content of at least 70% by weight, particularly preferably at least 80% by weight and in particular at least 85% by weight, of vicinal TDA. Suitable mixtures are for example obtained in the work-up of TDA in the preparation of TDI.

According to a further embodiment, the present invention is therefore directed to a polyol composition as disclosed above, wherein the diamine is selected from the group consisting of ethylenediamine, toluenediamine (TDA), diaminodiphenylmethane (MDA), polyphenylene polymethylene polyamines (PMDA), and mixtures thereof, in particular wherein the diamine is selected from the group consisting of ethylenediamine and toluenediamine (TDA).

According to a further embodiment, the present invention is therefore directed to a polyol composition as disclosed above, wherein the polyetherol (P2) is a toluene diamine-initiated alkylene oxide polyether polyol.

The polyetherol (P2) preferably has a hydroxyl number in the range from 100 to 1000 mg KOH/g, particularly preferably from 115 to 900 mg KOH/g and in particular from 130 to 800 mg KOH/g.

According to the present invention, the polyol mixture (PM) may comprise further polyols, such as polyetherols or polyesterols. According to a further embodiment, the polyol mixture (PM) preferably comprises a polyesterol (P3). According to a further embodiment, the present invention is therefore directed to a polyol composition as disclosed above, wherein the polyol mixture (PM) comprises at least one polyester polyol (P3).

The ratio and amounts of the polyols in the polyol mixture may vary in wide ranges. The polyol mixture of the present invention preferably comprises 10 to 80 parts by weight of polyetherol (P1), based on the weight of the polyol mixture (PM). According to one embodiment, the polyol mixture may comprise 10 to 75 parts by weight of polyetherol (P1), based on the weight of the polyol mixture (PM), more preferable 12 to 75 parts by weight. According to an alternative embodiment, the polyol mixture may comprise 50 to 80 parts by weight of polyetherol (P1), based on the weight of the polyol mixture (PM), more preferable 60 to 70 parts by weight According to a further embodiment, the present invention is therefore directed to a polyol composition as disclosed above, wherein polyol (P1) is present in the polyol mixture in an amount in the range of from 10 to 80 parts by weight based on the total weight of the polyol mixture.

The polyol mixture of the present invention preferably comprises 1 to 70 parts by weight of polyetherol (P2), based on the weight of the polyol mixture (PM). Even more preferably, the polyol mixture of the present invention comprises 5 to 50 parts by weight of polyetherol (P2), based on the weight of the polyol mixture (PM), particularly preferred 8 to 40 parts by weight.

According to a further embodiment, the present invention is therefore directed to a polyol composition as disclosed above, wherein polyol (P2) is present in the polyol mixture in an amount in the range of from 1 to 70 parts by weight based on the total weight of the polyol mixture.

In case the polyol mixture comprises polyesterol (P3), this may be present for example in an amount in the range of from 1 to 50 parts by weight, based on the weight of the polyol mixture (PM). Even more preferably, the polyol mixture of the present invention comprises 5 to 45 parts by weight of polyesterol (P3), based on the weight of the polyol mixture (PM), particularly preferred 10 to 40 parts by weight.

According to a further embodiment, the present invention is therefore directed to a polyol composition as disclosed above, wherein the polyol (P3) is present in the polyol mixture in an amount in the range of from 1 to 50 parts by weight based on the total weight of the polyol mixture.

Also the amount of the blowing agent used can vary in wide ranges. The amount of the hydro-haloolefin is preferably in the range from 3 to 40 parts by weight, based on the total weight of the polyol composition, even more preferably in the range from 5 to 35 parts by weight, based on the total weight of the polyol composition, particularly preferred in the range from 8 to 30 parts by weight, based on the total weight of the polyol composition.

According to a further embodiment, the present invention is therefore directed to a polyol composition as disclosed above, wherein the hydrohaloolefin is present in an amount of from 3 to 40 parts by weight based on the total weight of the polyol composition.

According to the present invention, also mixtures of suitable blowing agents can be used, such as for example mixtures of one or more hydrohaloolefin with water or mixtures of one or more hydrohaloolefin with pentane.

The polyol mixture may comprise further components for example catalysts or additives. The inventive polyol mixture may further contain a catalyst which is an adduct of an amine.

Preferably the amine is a sterically hindered amine. Useful are primary amine, secondary amine or tertiary amine. Useful tertiary amine catalysts non-exclusively include dicyclohexylmethylamine; ethyldiisopropylamine; dimethylcyclohexylamine; dimethylisopropylamine; methylisopropylbenzylamine; methylcyclopentylbenzylamine; isopropyl-sec-butyl-trifluoroethylamine; diethyl-(alpha-phenylethyl)amine, tri-n-propylamine, 1,4-Diazabicyclo [2.2.2]octane, N,N-bis[3-(dimethylamino)propyl]-N'-N'-dimethylpropane-1,3-diamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(alpha-trifluoromethylethyl)amine; di-(alpha-phenylethyl)amine; or combinations thereof. Useful primary amine catalysts non-exclusively include: triphenylmethylamine and 1,1-diethyl-n-propylamine.

Other useful amines include morpholines, imidazoles, ether containing compounds, and the like. These include dimorpholinodiethylether, N-ethylmorpholine, N-methylmorpholine, bis(dimethylaminoethyl) ether, imidazole, N-methylimidazole, 1,2-dimethylimidazole, dimorpholinodimethylether, N,N,N',N',N",N"-pentamethyldiethylenetriamine, N,N,N',N',N",N"-pentaethyldiethylenetriamine, N,N,N',N',N",N"-pentamethyldipropylenetriamine, N,N,N',N',N",N"-hexamethyl-1,3,5-triazine-1,3,5(2H,4H,6H)-tripropanamine, bis(diethylaminoethyl) ether, and bis(dimethylaminopropyl) ether.

The polyol mixture may optionally further comprise a non-amine catalyst. Suitable non-amine catalysts may comprise an organometallic compound or salt containing bismuth, lead, tin, titanium, antimony, uranium, cadmium, cobalt, thorium, aluminum, mercury, zinc, nickel, cerium, molybdenum, vanadium, copper, manganese, zirconium, sodium, potassium, or combinations thereof. These non-exclusively include bismuth nitrate, lead 2-ethylhexoate, lead benzoate, ferric chloride, antimony trichloride, antimony glycolate, stannous salts of carboxylic acids, zinc salts of carboxylic acids, dialkyl tin salts of carboxylic acids, potassium acetate, potassium octoate, potassium 2-ethylhexoate, glycine salts, quaternary ammonium carboxylates, alkali metal carboxylic acid salts, and N-(2-hydroxy-5-nonylphenol)methyl-N-methylglycinate, tin (II) 2-ethylhexanoate, dibutyltin dilaurate, dimethyl dineodecanoate tin, or combinations thereof. When the optional non-amine catalyst is used, it is usually present in the polyol mixture in an amount of from about 0.01 wt. % to about 2.5 wt. %, preferably from about 0.05 wt. % to about 2.25 wt. %, and more preferably from about 0.10 wt. % to about 2.00 wt. % by weight of the polyol mixture. While these are usual amounts, the quantity amount of metallic catalyst can vary widely, and the appropriate amount can be easily determined by those skilled in the art.

According to a further embodiment, the present invention is therefore directed to a polyol composition as disclosed above, wherein the polyol composition comprises at least one tertiary amine as catalyst.

The polyol mixture may comprise further additives and components. Suitable components are generally known to the person skilled in the art. The polyol mixture may comprise for example additives such as flame retardants, stabilizer such as ultraviolet stabilizers, surfactants or fillers.

According to a further embodiment, the present invention is therefore directed to a polyol composition as disclosed above, wherein the composition further comprises at least one of a flame retardant, an ultraviolet stabilizer, a surfactant or a filler.

The term foam stabilizer also refers to materials which promote formation of a regular cell structure during foam formation. Examples which may be mentioned are silicone-comprising foam stabilizers such as siloxane-oxyalkylene copolymers and other organopolysiloxanes. Mixtures of two or more stabilizers, in particular foam stabilizers, can also be used. Foam stabilizers are preferably used in an amount of from 0.5 to 4% by weight, particularly preferably from 1 to 3% by weight, based on the total weight of the components of the polyol composition.

Suitable surface-active substances that may also be added include, for example, compounds, which serve to aid the homogenization of the starting materials and also may be suitable for regulating the cell structure. Examples which may be mentioned are emulsifiers such as the sodium salts of castor oil sulfates or fatty acids and also amine salts of fatty acids, e.g. diethylamine oleate, diethylamine sterate, diethylamine ricinoleate, salts of sulfonic acid, e.g. Alkali metal or ammonium salts of dodecylbenzene or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil. Additives may also include cell regulators such as paraffins, fatty alcohols, dimethylpolysiloxanes. Oligomeric polyacrylates having polyoxyalkane and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the components other than the isocyanate component.

Suitable chain extender/crosslinkers that may be used include diols and/or triols having molecular weights of less than about 400. Examples of suitable chain extenders/crosslinkers are aliphatic, cycloaliphatic and/or aromatic diols having from 2 to 14, preferably from 4 to 10, carbon atoms, e.g., ethylene glycol; 1,3-propanediol; 1,10-decanediol; o-, m-, p-dihydroxycyclohexane; diethylene glycol; dipropylene glycol, and preferably 1,4-butanediol, 1,6-hexanediol and bis (2-hydroxyethyl) hydroquinone, triols such as 1,2,4- and 1,3,5-trihydroxyclylohexane, and low molecular weight hydroxyl-containing polyalkylene oxides based on ethylene oxide and/or 1,2-propylene oxide in the above-mentioned diols and/or triols as initiator molecules. These compounds are preferably used in amounts of from 0 to 20% by weight based on the total weight of the polyol mixture.

Flame retardants that may be used include pentabromodiphenyl oxide; dibromopropanol; tris (beta-chloropropyl) phosphate; 2,2-bis (bromoethyl) 1,3-propanediol; tetrakis (2-chloroethyl) ethylene diphosphate; tris (2,3-dibromopropyl) phosphate; tris (beta-chloroethyl) phosphate; tris (1,2-dichloropropyl) phosphate; bis-(2-chloroethyl) 2-chloroethylphosphonate; molybdenumtrioxide; ammonium molybdate; ammonium phosphate; pentabromodiphenyloxide; tricresyl phosphate; hexabromocyclododecane; melamine; and dibromoethyldibromocyclohexane. Concentrations of flame retardant compounds, which may be employed range from 5 to 50 parts per 100 parts of polyol mixture.

The foam may further include fillers such as organic, inorganic and reinforcing fillers. Specific examples are: inorganic fillers such as siliceous minerals, for example, sheet silicates such as antigorite, serpentine, hornblends, amphiboles, chrysotile, zeolites, talc; metal oxides, such as kaolin, aluminum oxides, titanium oxides and iron oxides, meta salts, such as chalk, barite, aluminum silicates and inorganic pigments such as cadmium sulfide, zinc sulfide, and also glass particles. Examples of organic fillers are: carbon black, melamine, rosin, cyclopentadienyl resins. The organic and inorganic fillers can be used individually or as mixtures and are advantageously incorporated into the reaction mixture in amounts of from 0.5 to 50% by weight based on the weight of the polyol and the isocyanate component.

According to a further aspect, the present invention is also directed to a process for preparing a polyurethane foam, comprising the step (i)

(i) reacting at least one polyisocyanate with a polyol composition comprising:
  (a) a polyol mixture (PM) comprising a polyetherol (P1) based on a polyhydric alcohol and a polyetherol (P2) based on a diamine; and
  (b) at least one hydrohaloolefin (HFO) as blowing agent.

With respect to the preferred components of the polyol mixture, reference is made to the disclosure above.

To form the foam of the present invention the polyol mixture, catalyst and any other components are premixed. The premix is combined, for example in a mixing head with the polyisocyanate component and the mixture is processed by any of the methods commonly known in the art. For example, foam may be produced using reaction injection moldings, in an open or closed mold, or in a pour in place application where the surfaces contacting the reaction mixture become a part of the finished article.

The method for producing polyurethane foams, in particular rigid polyurethane foams, in the manner of the present invention is performable according to the known procedures, for example by hand mixing or preferably by means of foaming machines. When the method is performed using a foaming machine, high-pressure or low-pressure machines are usable. The method of the present invention may be carried out in a continuous manner as well as batchwise.

A comprehensive survey of the state of the art, the raw materials which can be used and methods which can be used is found in "Ullmann's Encyclopedia of Industrial Chemistry" Vol. A21, VCH, Weinheim, 4th edition 1992, pp. 665 to 715.

Foams may also be produced by a continuous laminate process, which process is well known in the industry.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124,605; and 3,201,372. Preferred as a class are the aromatic polyisocyanates.

The isocyanate component is preferably a polyisocyanate, herein defined as having 2 or more isocyanate functionalities, examples of these include conventional aliphatic, cycloaliphatic, and preferably aromatic isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures 4,4'-, 2,2'- and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures, and 2,2'-diphenylmethane diisocyanate and the corresponding isomeric mixtures, mixtures of 4,4'-, 2,4'-, and 2,2-diphenylmethane diisocyanates and polyphenylene polymethylene polyisocyanates (crude MDI).

In one embodiment, the polyisocyanate component used in conjunction with the polyol mixture of the present invention to produce an urethane foam diphenylemethane diisocyanate (MDI), polymeric MDI or a isocyanate terminated prepolymer comprising, for example, the reaction product of a polyester polyol and MDI. Generally, the isocyanate and the polyol mixture are combined at an isocyanate index of from 100 to 350, with an index of preferably from 105 to 300.

To produce rigid polyurethane foams use is made in particular of crude MDI. Suitable isocyanates are for example Lupranat M20 and M50 from BASF.

According to a further aspect, the present invention is also directed to a polyurethane foam obtained or obtainable by a process comprising the reaction of at least one polyisocyanate with a polyol composition comprising:

(a) a polyol mixture (PM) comprising a polyetherol (P1) based on a polyhydric alcohol and a polyetherol (P2) based on a diamine; and (b) at least one hydrohaloolefin (HFO) as blowing agent.

The polyurethane foams of the present invention have good thermally insulating properties in particular.

The foams according to the present invention can advantageously be used in sprayfoam for roof and wall, building panels, building envelope insulation, refrigerators and freezers, water heaters and boilers, LNG tanks, reefer containers, trailers, and pipes.

The present invention is further illustrated by the following embodiments and combinations of embodiments as indicated by the respective dependencies and back-references. In particular, it is noted that in each instance where a range of embodiments is mentioned, for example in the context of a term such as “The process of any one of embodiments 1 to 4”, every embodiment in this range is meant to be explicitly disclosed for the skilled person, i.e. the wording of this term is to be understood by the skilled person as being synonymous to “The process of any one of embodiments 1, 2, 3, and 4”.

1. A polyol composition comprising
   (a) a polyol mixture (PM) comprising a polyetherol (P1) based on a polyhydric alcohol and a polyetherol (P2) based on a diamine; and
   (b) at least one hydrohaloolefin (HFO) as blowing agent.
2. The polyol composition according to embodiment 1, wherein the polyhydric alcohol is selected from the group consisting of sucrose, pentaerythritol, glucose, glycerol, glycol, trimethylolpropane (TMP) and sorbitol, or combinations thereof.
3. The polyol composition according to any one of embodiments 1 or 2, wherein the diamine is selected from the group consisting of ethylenediamine, toluenediamine, diaminodiphenylmethane (MDA), polyphenylene polymethylene polyamines (PMDA), and mixtures thereof.
4. The polyol composition according to any one of embodiments 1 to 3, wherein the hydrohaloolefin is selected from the group consisting of trans-1-chloro-3,3,3-trifluoro-propene (HCFO-1233zd(E)), cis-1-chloro-3,3,3-trifluoropropene (HCFO-1233zd(Z)), trans-1,1,1,4,4,4-hexafluoro-but-2-ene (HFO1336mzz(E)), cis-1,1,1,4,4,4-hexafluoro-but-2-ene (HFO1336mzz(Z)), trans-1,3,3,3-tetrafluorprop-1-en (HFO1234ze(E)), cis-1,3,3,3-tetrafluorprop-1-en (HFO1234ze(Z)).
5. The polyol composition according to any one of embodiments 1 to 4, wherein the polyol composition comprises at least one tertiary amine as catalyst.
6. The polyol composition according to any of embodiments 1 to 5, wherein the polyetherol (P2) is a toluene diamine-initiated alkylene oxide polyether polyol.
7. The polyol composition according to any of embodiments 1 to 5, wherein the polyetherol (P2) has a hydroxyl number in the range of from 100 to 1000 mg KOH/g.
8. The polyol composition according to any of embodiments 1 to 7, wherein polyol (P1) is present in the polyol mixture in an amount in the range of from 10 to 80 parts by weight based on the total weight of the polyol mixture.
9. The polyol composition according to any of embodiments 1 to 8, wherein polyol (P2) is present in the polyol mixture in an amount in the range of from 1 to 70 parts by weight based on the total weight of the polyol mixture.
10. The polyol composition according to any of embodiments 1 to 9, wherein the polyol mixture (PM) comprises at least one polyester polyol (P3).
11. The polyol composition according to embodiment 10, wherein the polyol (P3) is present in the polyol mixture in an amount in the range of from 1 to 50 parts by weight based on the total weight of the polyol mixture.
12. The polyol composition according to any of embodiments 1 to 11, wherein the hydrohaloolefin is present in an amount of from 3 to 40 parts by weight based on the total weight of the polyol composition.
13. The polyol composition according to any of embodiments 1 to 12, wherein the composition further comprises at least one of a flame retardant, an ultraviolet stabilizer, a surfactant or a filler.
14. A polyol composition comprising
   (a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a polyetherol (P2) based on a diamine selected from the group consisting of ethylenediamine, toluenediamine, diaminodiphenylmethane (MDA), polyphenylene polymethylene polyamines (PMDA), and mixtures thereof; and
   (b) at least one hydrohaloolefin (HFO) as blowing agent.
15. A polyol composition comprising
   (a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a toluene diamine-initiated alkylene oxide polyether polyol as polyetherol (P2); and (b) at least one hydrohaloolefin (HFO) as blowing agent.

16. A polyol composition comprising (a) a polyol mixture (PM) comprising a polyetherol (P1) based on a polyhydric alcohol and a toluene diamine-initiated alkylene oxide polyether polyol as polyetherol (P2); and (b) at least one hydrohaloolefin (HFO) as blowing agent;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture.

17. A polyol composition comprising (a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a toluene diamine-initiated alkylene oxide polyether polyol as polyetherol (P2); and (b) at least one hydrohaloolefin (HFO) as blowing agent;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture.

18. A polyol composition comprising (a) a polyol mixture (PM) comprising a polyetherol (P1) based on a polyhydric alcohol and a toluene diamine-initiated alkylene oxide polyether polyol as polyetherol (P2); and (b) at least one hydrohaloolefin (HFO) as blowing agent;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture; and wherein the polyol mixture (PM) comprises at least one polyester polyol (P3) which is present in the polyol mixture in an amount in the range of from 1 to 50 parts by weight based on the total weight of the polyol mixture.

19. A polyol composition comprising (a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a toluene diamine-initiated alkylene oxide polyether polyol as polyetherol (P2); and (b) at least one hydrohaloolefin (HFO) as blowing agent;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture, and wherein the polyol mixture (PM) comprises at least one polyester polyol (P3) which is present in the polyol mixture in an amount in the range of from 1 to 50 parts by weight based on the total weight of the polyol mixture.

20. A polyol composition comprising (a) a polyol mixture (PM) comprising a polyetherol (P1) based on a polyhydric alcohol and a toluene diamine-initiated alkylene oxide polyether polyol as polyetherol (P2); and (b) at least one hydrohaloolefin (HFO) as blowing agent present in an amount of from 3 to 40 parts by weight based on the total weight of the polyol composition;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture; and wherein the polyol mixture (PM) comprises at least one polyester polyol (P3) which is present in the polyol mixture in an amount in the range of from 1 to 50 parts by weight based on the total weight of the polyol mixture.

21. A polyol composition comprising (a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a toluene diamine-initiated alkylene oxide polyether polyol as polyetherol (P2); and (b) at least one hydrohaloolefin (HFO) as blowing agent present in an amount of from 3 to 40 parts by weight based on the total weight of the polyol composition;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture, and wherein the polyol mixture (PM) comprises at least one polyester polyol (P3) which is present in the polyol mixture in an amount in the range of from 1 to 50 parts by weight based on the total weight of the polyol mixture.

22. A process for preparing a polyurethane foam, comprising the step (i)

(i) reacting at least one polyisocyanate with a polyol composition comprising:

(a) a polyol mixture (PM) comprising a polyetherol (P1) based on a polyhydric alcohol and a polyetherol (P2) based on a diamine; and (b) at least one hydrohaloolefin (HFO) as blowing agent.

23. A process for preparing a polyurethane foam, comprising the step (i)

(i) reacting at least one polyisocyanate with a polyol composition comprising:

(a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a polyetherol (P2) based on a diamine selected from the group consisting of ethylenediamine, toluenediamine, diaminodiphenylmethane (MDA), polyphenylene polymethylene polyamines (PMDA), and mixtures thereof; and (b) at least one hydrohaloolefin (HFO) as blowing agent.

24. A process for preparing a polyurethane foam, comprising the step (i)

(i) reacting at least one polyisocyanate with a polyol composition comprising:

(a) a polyol mixture (PM) comprising a polyetherol (P1) based on a polyhydric alcohol and a toluene diamine-initiated alkylene oxide polyether polyol as polyetherol (P2); and (b) at least one hydrohaloolefin (HFO) as blowing agent.

25. A process for preparing a polyurethane foam, comprising the step (i)

(i) reacting at least one polyisocyanate with a polyol composition comprising:

(a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a toluene diamine-initiated alkylene oxide polyether polyol as polyetherol (P2); and (b) at least one hydrohaloolefin (HFO) as blowing agent.

26. A process for preparing a polyurethane foam, comprising the step (i)

(i) reacting at least one polyisocyanate with a polyol composition comprising:

(a) a polyol mixture (PM) comprising a polyetherol (P1) based on a polyhydric alcohol and a toluene diamine-initiated alkylene oxide polyether polyol as polyetherol (P2); and (b) at least one hydrohaloolefin (HFO) as blowing agent;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture.

27. A process for preparing a polyurethane foam, comprising the step (i)

(i) reacting at least one polyisocyanate with a polyol composition comprising:

(a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a toluene diamine-initiated alkylene oxide polyether polyol as polyetherol (P2); and (b) at least one hydrohaloolefin (HFO) as blowing agent;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture.

28. A process for preparing a polyurethane foam, comprising the step (i)

(i) reacting at least one polyisocyanate with a polyol composition comprising:

(a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a toluene diamine-initiated alkylene oxide polyether polyol as polyetherol (P2); and (b) at least one hydrohaloolefin (HFO) as blowing agent;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture, and wherein the polyol mixture (PM) comprises at least one polyester polyol (P3) which is present in the polyol mixture in an amount in the range of from 1 to 50 parts by weight based on the total weight of the polyol mixture.

29. A process for preparing a polyurethane foam, comprising the step (i)

(i) reacting at least one polyisocyanate with a polyol composition comprising:

(a) a polyol mixture (PM) comprising a polyetherol (P1) based on a polyhydric alcohol and a toluene diamine-initiated alkylene oxide polyether polyol as polyetherol (P2); and (b) at least one hydrohaloolefin (HFO) as blowing agent present in an amount of from 3 to 40 parts by weight based on the total weight of the polyol composition;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture; and wherein the polyol mixture (PM) comprises at least one polyester polyol (P3) which is present in the polyol mixture in an amount in the range of from 1 to 50 parts by weight based on the total weight of the polyol mixture.

30. A process for preparing a polyurethane foam, comprising the step (i)

(i) reacting at least one polyisocyanate with a polyol composition comprising:

(a) a polyol mixture (PM) comprising a polyetherol (P1) based on a polyhydric alcohol selected from the group consisting of sucrose, pentaerythritol, glucose, glycerol, glycol, trimethylolpropane (TMP) and sorbitol, or combinations thereof and a toluene diamine-initiated alkylene oxide polyether polyol as polyetherol (P2); and (b) at least one hydrohaloolefin (HFO) as blowing agent present in an amount of from 3 to 40 parts by weight based on the total weight of the polyol composition;

wherein polyol (P1) is present in the polyol mixture in an amount in the range of from 10 to 80 parts by weight based on the total weight of the polyol mixture and polyol (P2) is present in the polyol mixture in an amount in the range of from 1 to 70 parts by weight based on the total weight of the polyol mixture, and wherein the polyol mixture (PM) comprises at least one polyester polyol (P3) which is present in the polyol mixture in an amount in the range of from 1 to 50 parts by weight based on the total weight of the polyol mixture.

31. A process for preparing a polyurethane foam, comprising the step (i)
    (i) reacting at least one polyisocyanate with a polyol composition according to any of embodiments 1 to 21.
32. A polyurethane foam obtained or obtainable by a process according to any of embodiments 22 to 31.
33. A polyurethane foam obtained or obtainable by a process comprising the reaction of at least one polyisocyanate with a polyol composition comprising:
    (a) a polyol mixture (PM) comprising a polyetherol (P1) based on a polyhydric alcohol and a polyetherol (P2) based on a diamine; and
    (b) at least one hydrohaloolefin (HFO) as blowing agent.

Examples will be used below to illustrate the invention.

EXAMPLES

1. Methods:

1.1 Determination of the hydroxyl numbers:

The hydroxyl numbers were determined according to DIN 53240 (1971-12).

1.2 Determination of the demolding behavior (only for refrigeration):

The demolding behavior was determined by measuring the post-expansion of foam bodies produced using a box mold having the dimensions 700×400×90 $mm^3$ at a temperature of 45±2° C. as a function of the demolding time and the overpacking (OP=the ratio of overall foam density to minimum fill density). The post-expansion was determined by measuring the height of the foam cuboids after 24 hours.

The less the measured height of the foam cuboids differ from 90 mm, the better is the demolding behavior.

1.3 Determination of the minimum fill density (only for refrigeration):

For the determination of the minimum fill density a mold box with dimensions 2000×200×50 $mm^3$ at a temperature of 45±2° C. is filled with enough polyurethane reaction mixture to just fill the mold without direct contact with the end of the mold. The flow distance is measured. The MFD is then calculated according to MFD=(m*L/(V*s)) where m=shot weight; L=Length of the mold, s=Flow distance=effective length of the foam, V=Volume of the mold 1.4. Determination of free rise density:

1.4.1 Refrigeration: About 900 g of reaction mixture is injected in a PE bag (about 30 cm in diameter). To determine the free rise core density of the foam after curing (24 h later), samples are cut out of the middle of the sample. They are weighed and their volume is determined by immersion in a water bath. These quantities are used to compute their density and the mean value is reported.

1.4.2 Spray foam: 3 different free rise densities are determined by spray foam.

Beaker free rise density: This is the foam density obtained by a hand-mix foam in a beaker of known volume. The system components are mixed directly in a beaker. After foam curing the part of the foam that stands above the rim of the beaker is cut off. The beaker free rise density is the quotient between the weight of the foam contained in the beaker and its volume.

Core free rise density: Several layers of reaction mixture are sprayed on a PE plate. To determine the free rise core density after curing of the foam, samples are cut out of the middle of the foam without skins. They are weighted and their volume is determined measuring the three dimensions of the cut specimens with a caliper. These quantities are used to compute their density and the mean value is reported.

Total free rise density: From the same foam sprayed on the PE plate to obtain the core free rise density other foam specimens are cut out from the middle of the sample with all skins from bottom to top. They are weighted and their volume is determined by immersion in a water bath. These quantities are used to compute their density and the mean value is reported.

1.5 Determination of cream time:

Cream time is defined as time interval between shot commencement and commencement of volume expansion of the reaction mixture.

1.6 Determination of string time (also known as gel time):

The string time is defined as time interval between shot commencement and the moment at which fibers can be pulled out of the reaction mixture using a foam strip or a rod.

1.7 Determination of rise time:

The rise time is defined as time interval between shot commencement and the end of volume expansion.

1.8 Determination of tack free time (only for spray foam):

The tack free time is defined as time interval between shot commencement and the moment at which the top surface of the foam is established as no longer tacker determined by means of a foam strip or a rod.

1.9 Determination of thermal conductivity:

1.9.1 Refrigeration: The thermal conductivity is determined using a heat flow measurement plate instrument Taurus TCA300 DTX at an average temperature of 10° C. In order to produce the test specimens, the polyurethane reaction mixture is introduced into heated mold having dimensions 2000×200×50 $mm^3$ (14.5% overpacking) and removed from the mold after 5 min (→Table 1) or 7 min (→Table 2). After storage for 24 h under standard conditions of temperature and humidity, a plurality of cuboids of about 200×200×50 $mm^3$ in size are cut out of the middle (positions 10, 900 and 1700 mm based on the start of the mold). The upper and lower side were subsequently removed so that test specimens have dimensions of 200×200×30 $mm^3$.

1.9.2 Spray foam: The thermal conductivity is determined using a heat flow measurement plate instrument Lasercomp FOX 314 or Taurus TCA300 DTX at an average temperature of 10° C. in accordance with European Standard EN 12667. In order to produce the test specimens several layers of reaction mixture are sprayed on a PE plate.

Three types of thermal conductivity values are determined for spray foam:

(a) Initial value of thermal conductivity (in accordance with EN 14315-1-C.3): a test specimen with dimensions of 300×300×30 mm is cut from a core foam sample, which is maximum 8 days old. After conditioning for at least 16 h of the cut specimen for at least 16 h at 23±3° C. and 50±10% relative humidity the thermal conductivity is determined as before described.

(b) Normality test value of thermal conductivity for fixed increment method to calculate aged value of thermal conductivity (in accordance with EN 14315-1-C.5): a test specimen with dimensions of 300×300×(20-22) mm is cut from a core foam sample, which is maximum 8 days old. Initial value thermal conductivity of this thinner specimen is determined in the same way as before described. Afterwards this specimen is stored at 70±2° C. during 21±1 days. After ageing the specimen is reconditioned for at least 16 h at 23±3° C. and 50±10% and thermal conductivity again measured. Normality test value is the difference between initial and aged value.

(c) Accelerated aged value of thermal conductivity (in accordance with EN 14315-1-C.4): in this case the entire uncut spray foam with all skins from top to bottom is stored at 70±2° C. during 175±5 days. After ageing the foam is conditioned for at least 16 h at 23±3° C. and 50±10%. Afterwards a test specimen with dimensions of 300×300×30 mm is cut from aged core foam sample and thermal conductivity measured as before described.

2. Starting Materials:

Polyol A1: Polyetherol based on vic-TDA and PO, OH value: 400 mg KOH/g

Polyol A2: Polyetherol based on vic-TDA, EO and PO, OH value: 160 mg KOH/g

Polyol A3: Polyetherol based on vic-TDA, EO and PO, OH value: 390 mg KOH/g

Polyol B1: Polyetherol based on sucrose, glycerol and PO, OH value: 450 mg KOH/g Polyol B2: Polyetherol based on sorbitol and PO, OH value: 490 mg KOH/g Polyol B3: Polyetherol based on glycerol, EO and PO, OH value: 158 mg KOH/g Polyol C1: Polyetherol based on sucrose, pentaerythritol, DEG and PO, OH value: 403 mg KOH/g Polyol C2: Polyetherol based on PG and PO, OH value: 104 mg KOH/g Polyol C3: Polyetherol based on glycerol and PO, OH value: 400 mg KOH/g Polyol D1: Polyesterol based on terephthalic acid, oleic acid, phthalic anhydride, glycerol and DEG, OH value: 245 mg KOH/g Polyol D2: Polyetherol based on TMP and EO, OH value: 605 mg KOH/g Polyol E: Polyetherol based on sucrose, DEG, EO and PO, OH value: 400 mg KOH/g Catalyst mixture F) comprising:

Catalyst F1): Dimethyl cyclohexylamine

Catalyst F2): Bis-(2-dimethylaminoethyl)ether

Catalyst F3): Potassium acetate

The catalyst mixture F) used in the examples comprises the catalysts F1 to F3, containing 50-95% of catalyst F1, 5-30% of catalyst F2 and 0-35% of catalyst F3.

Catalyst mixture G) comprising:

Catalyst G1): 1,1,3,3-Tetramethylguanidine

Catalyst G2): 1,2-Dimethylimidazole

Catalyst G3): Dibutyl tin dilaurate

Catalyst G4): Pentamethyldiethylenetriamine

The catalyst mixture G) used in the examples comprises the catalysts G1 to G4, containing 50-70% of catalyst G1, 20-40% of catalyst G2, 1-10% of catalyst G3, and 1-10% of catalyst G4.

Surfactant H1): Silicone surfactant, Tegostab® B8467, Tegostab® B8474 and/or Tegostab® B8491 by Evonik Surfactant H2): Silicone surfactant, Niax® Silicone L-6906MB by Momentive and/or Dabco® DC 193 by AirProducts Crosslinker I): Glycerol, OH value: 1825 mg KOH/g Flame retardant J): Tris (2-chloro isopropyl) phosphate Isocyanate: Polymeric MDI, NCO content: 31.5 pbw (Lupranat® M20)

3. Preparation Procedure 3.1 Refrigeration

A polyol component was produced from the raw materials indicated. The polyol component was mixed with the amount of the indicated isocyanate required to achieve an isocyanate index (=the ratio of actual amount of isocyanate used to theoretical amount of isocyanate required) as shown in Table 1 or Table 2 by means of a high-pressure Puromat® KM 16/40 (KraussMaffei) at a discharge rate of 250 g/sec.

The reaction mixture was injected into temperature-controlled molds having dimensions of 2000 mm×200 mm×50 mm or 400 mm×700 mm×90 mm and allowed to foam there. The overpacking was 17.5%.

In Table 1 and 2, the respective compositions and the results for the polyurethane foams obtained are summarized. The amount of the blowing agent (HCFO-1233zd(E)) is given in parts per weight, based on 100 parts of the polyol component (→Table 1) or in 100 parts of the polyol component (→Table 2).

TABLE 1

| Refrigeration 1 | | | |
|---|---|---|---|
| | Inventive example 1 | Comparative example 1,1 | Comparative example 1,2 |
| Polyol A1 | 25.0 | | |
| Polyol A2 | 10.0 | | |
| Polyol A3 | | | |
| Polyol B1 | 57.0 | 57.0 | 55.0 |
| Polyol B2 | | 25.0 | 24.0 |
| Polyol B3 | | 10.0 | 11.7 |
| Polyol C1 | | | |
| Polyol C2 | | | |
| Polyol C3 | | | |
| Catalyst composition F | 3.5 | 3.5 | 4.7 |

TABLE 1-continued

| Refrigeration 1 | | | | | | | | | |
|---|---|---|---|---|---|---|---|---|---|
| | Inventive example 1 | | | Comparative example 1,1 | | | Comparative example 1,2 | | |
| Surfactant H1 | | 3.0 | | | 3.0 | | | 3.0 | |
| $H_2O$ | | 1.5 | | | 1.5 | | | 1.6 | |
| Sum (without physical blowing agent) | | 100 | | | 100 | | | 100 | |
| HCFO | | 30 | | | 30 | | | 30 | |
| Sum (with physical blowing agent) | | 130 | | | 130 | | | 130 | |
| NCO Index | | 119 | | | 119 | | | 119 | |
| Reacitivity | | initial | 4 wk[1)] | | initial | 4 wk[1)] | | initial | 4 wk[1)] |
| String time [s] | | 40 | 41 | | 55 | 54 | | 41 | 44 |
| Free rise density [g/L] | | 22.7 | 23.4 | | 24.4 | 24.6 | | 22.9 | 23.6 |
| Thermal conductivity [mW/(m·K)] | — | 17.9 | 18.0 | — | 18.3 | 18.5 | — | 18.3 | 18.5 |
| Post-expansion at 17.5% overpacking | min | initial | 4 wk[1)] | min | initial | 4 wk[1)] | min | initial | 4 wk[1)] |
| Thickness [mm] | 4 | 92.7 | 93.0 | 4 | tbd | tbd | 4 | 94.0 | 95.3 |
| Thickness [mm] | 5 | 91.8 | 92.1 | 5 | tbd | tbd | 5 | 92.8 | 94.2 |
| Thickness [mm] | 7 | 90.8 | 90.9 | 7 | tbd | tbd | 7 | 91.6 | 92.7 |

[1)]Storage condition: Room temperature, 4 wk = after 4 weeks

TABLE 2

| Refrigeration 2 | | | | | | | | | |
|---|---|---|---|---|---|---|---|---|---|
| | Inventive example 2 | | | Comparative example 2,1 | | | Comparative example 2,2 | | |
| Polyol A1 | | | | | | | | | |
| Polyol A2 | | | | | | | | | |
| Polyol A3 | | 19.4 | | | | | | | |
| Polyol B1 | | | | | | | | | |
| Polyol B2 | | | | | | | | | |
| Polyol B3 | | | | | | | | | |
| Polyol C1 | | 48.5 | | | 48.5 | | | 48.1 | |
| Polyol C2 | | 9.7 | | | 9.7 | | | 9.7 | |
| Polyol C3 | | | | | 19.4 | | | 19.4 | |
| Catalyst composition F | | 1.0 | | | 1.0 | | | 1.4 | |
| Surfactant G1 | | 2.0 | | | 2.0 | | | 2.0 | |
| $H_2O$ | | 1.9 | | | 1.9 | | | 1.9 | |
| Sum (without physical blowing agent) | | 82.5 | | | 82.5 | | | 82.5 | |
| HCFO | | 17.5 | | | 17.5 | | | 17.5 | |
| Sum (with physical blowing agent) | | 100 | | | 100 | | | 100 | |
| NCO Index | | 110 | | | 110 | | | 110 | |
| Reacitivity | | initial | 13 wk[1)] | | initial | 13 wk[1)] | | initial | 13 wk[1)] |
| String time [s] | | 85 | 89 | | 94 | 108 | | 84 | 95 |
| Free rise density [g/L] | | 23.3 | 23.4 | | 24.2 | 24.5 | | 23.9 | 24.8 |
| Thermal conductivity [mW/(m·K)] | — | 19.3 | 19.6 | — | 19.9 | 20.2 | — | 19.9 | 20.0 |
| Post-expansion at 17.5% overpacking | min | initial | 13 wk[1)] | min | initial | 13 wk[1)] | min | initial | 13 wk[1)] |
| Thickness [mm] | 12 | 92.0 | 91.9 | 12 | 92.0 | 92.5 | 12 | 92.1 | 92.3 |
| Thickness [mm] | 14 | 90.9 | 90.9 | 14 | 91.2 | 91.6 | 14 | 91.4 | 91.7 |

[1)]Storage condition: Room temperature, 13 wk = after 13 weeks

The data summarized in table 1 show that the foams prepared using the polyol composition according to the invention show improved post-expansion. The post-expansion for the initial composition using TDA-based polyols is lower than the post-expansion of the initial composition of the comparative example. After aging, the post-expansion for the composition using TDA-based polyols is lower in absolute and relative figures than the post-expansion of the aged composition of the comparative example.

The data summarized in table 2 show that the foams prepared using the polyol composition according to the invention show improved post-expansion. The initial post-expansions of inventive and comparative examples are comparable, but after aging, the post-expansion for the composition using TDA-based is lower than the post-expansion of the aged composition of the comparative example. Furthermore, after aging the string time of the comparative example is significantly higher than the string time of the inventive example. The reactivity of the aged inventive example remained on the same level as the initial one.

3.2 Spray foam

A polyol component was produced from the raw materials indicated. The polyol component was mixed with the amount of the indicated isocyanate required to achieve an isocyanate index of 108 by means of a high-pressure Graco reactor H-25 at a discharge rate of 80 g/sec.

The reaction mixture was sprayed without overpacking in several layers up to a height of at least 50 mm on a non-temperature-controlled plate of PE having dimensions of 80×80 $mm^2$.

In Table 3, the respective compositions and the results for the polyurethane foams obtained are summarized. The amount of the blowing agent (HCFO-1233zd(E)) is given in parts per weight, based in 100 parts of the polyol component.

TABLE 3

| Spray foam | Inventive example 3 | Comparative example 3 |
|---|---|---|
| Polyol A3 | 12.0 | |
| Polyol B1 | 10.0 | |
| Polyol D1 | 36.0 | 36.0 |
| Polyol D2 | 5.0 | |
| Polyol E | | 27.3 |
| Catalyst composition G | 6.45 | 6.45 |
| Surfactant H2 | 0.8 | 0.8 |
| Crosslinker I | 0.8 | 1.5 |
| Flame retardant J | 16.0 | 16.0 |
| $H_2O$ | 1.95 | 1.95 |
| HCFO | 11.0 | 10.0 |
| Sum | 100 | 100 |
| NCO-Index | 108 | 108 |
| Core free rise density [mg KOH/g] | 36.5 | 37.4 |
| Total free rise density [mg KOH/g] | 38.2 | 38.5 |
| Initial value of thermal conductivity [mW/(m · K)] | 20.3 | 20.5 |
| Initial | | |
| Cream time [s] | 3.8 | 4.1 |
| String time [s] | 7.1 | 7.3 |
| Rise time [s] | 11.2 | 12.5 |
| Beaker free rise density [g/L] | 33.8 | 34.2 |

TABLE 3-continued

| Spray foam | Inventive example 3 | Comparative example 3 |
|---|---|---|
| After storage[2)] | | |
| Cream time [s] | 4.8 | 4.9 |
| String time [s] | 9.5 | 10.6 |
| Rise time [s] | 13.2 | 17.1 |
| Beaker free rise density [g/L] | 34.2 | 36.2 |

[2)] Storage condition: 45° C., 1 month

The examples show that the composition comprising the TDA-polyol does not age as fast composition is significantly higher than the cream, string and rise time of the inventive example.

LITERATURE CITED

U.S. Pat. No. 7,230,146
U.S. Pat. No. 7,189,884
U.S. Pat. No. 6,844,475
U.S. Pat. No. 6,403,847
WO 2009/048807 A2
"Ullmann's Encyclopedia of Industrial Chemistry" Vol. A21, VCH, Weinheim, 4th edition 1992, pp. 665 to 715
U.S. Pat. No. 4,868,224
U.S. Pat. No. 3,401,190
U.S. Pat. No. 3,454,606
U.S. Pat. No. 3,277,138
U.S. Pat. No. 3,492,330
U.S. Pat. No. 3,001,973
U.S. Pat. No. 3,394,164
U.S. Pat. No. 3,124,605
U.S. Pat. No. 3,201,372

The invention claimed is:

1. A polyol composition, comprising:

(a) a polyol mixture (PM) comprising a polyetherol (P1) based on a polyhydric alcohol and a polyetherol (P2) based on a diamine; and (b) at least one hydrohaloolefin as a blowing agent, wherein the diamine is selected from the group consisting of etbylenediamine, toluenediamine (TDA), and mixtures thereof, polyetherol (P2) is present in the polyol mixture in an amount in the range of from 1 to 40 parts by weight based on the total weight of the polyol mixture, said polyol mixture comprises 60 to 80 parts by weight of polyetherol (P1), at least one hydrohaloolefin is present in an amount of from 3 to 40 parts by weight based on the total weight of the polyol composition, the polyol composition comprises at least one tertiary amine as catalyst, and wherein said polyhydric alcohol is at least one selected from the group consisting of sucrose, pentaerythritol, glucose, glycerol, a glycol, trimethylolpropane (TMP), and combinations thereof.

2. The polyol composition according to claim 1, wherein the at least one hydrohaloolefin is at least one selected from the group consisting of trans-1-chloro-3,3,3-trifluoro-propene (HCFO-1233zd(E)), cis-1-chloro-3,3,3-trifluoro-propene (HCFO-1233zd(Z)), trans-1,1,1,4,4,4-hexafluoro-but-2-ene (HFO-1336mzz(E)), cis-1,1,1,4,4,4-hexafluoro-but-2- ene (HFO-1336mzz(Z)), trans-1,3,3,3-tetrafluoroprop-1-ene (HFO-1234ze(E)), and cis-1,3,3,3-tetrafluoroprop-1-ene (HFO-1234ze(Z)).

3. The polyol composition according to claim 1, wherein the polyetherol (P2) is a toluene diamine-initiated alkylene oxide-based polyether polyol.

4. The polyol composition according to claim 1, wherein the polyetherol (P2) has a hydroxyl number in the range of from 100 to 1000 mg KOH/g.

5. The polyol composition according to claim 1, wherein the polyol mixture (PM) further comprises at least one polyester polyol (P3).

6. The polyol composition according to claim 5, wherein the at least one polyester polyol (P3) is present in the polyol mixture in an amount in the range of from 1 to 50 parts by weight based on the total weight of the polyol mixture.

7. The polyol composition according to claim 1, wherein the polyol composition further comprises at least one selected from the group consisting of a flame retardant, an ultraviolet stabilizer, a surfactant and a filler.

8. A process for preparing a polyurethane foam, comprising:

preparing and storing the polyol composition according to claim 1 to form a stored polyol composition; and reacting at least one polyisocyanate with said stored polyol composition.

9. A polyurethane foam, obtained by the process according to claim 8.

10. The polyol composition according to claim 1, where said polyol composition excludes dicyclohexylmethylamine.

11. The process according to claim 8, wherein said polyol composition is stored for at least 4 weeks.

12. The polyol composition according to claim 1, wherein said polyol composition excludes a hydrocarbon blowing agent.

13. The polyol composition according to claim 1, wherein said polyol composition excludes pentane.

* * * * *